US006901224B1

United States Patent
Davis

(10) Patent No.: US 6,901,224 B1
(45) Date of Patent: May 31, 2005

(54) HYBRID COHERENT-OPTICAL, RF SIGNAL CHANNELIZER

(75) Inventor: Richard L. Davis, Redondo Beach, CA (US)

(73) Assignee: Northrop Grumman Corporation, Los Angeles, CA (US)

(*) Notice: Subject to any disclaimer, the term of this patent is extended or adjusted under 35 U.S.C. 154(b) by 0 days.

(21) Appl. No.: 09/507,514

(22) Filed: Feb. 18, 2000

(51) Int. Cl.[7] ............................................. H04B 10/06
(52) U.S. Cl. ........................................ 398/202; 398/212
(58) Field of Search .................................. 398/115, 116, 398/117, 202, 204, 212

(56) References Cited

U.S. PATENT DOCUMENTS

| | | | |
|---|---|---|---|
| 3,931,460 A | | 1/1976 | Watson et al. |
| 4,305,666 A | * | 12/1981 | Becherer et al. ............ 356/457 |
| 4,448,494 A | | 5/1984 | Freyre et al. |
| 4,468,766 A | * | 8/1984 | Spezio ........................ 359/326 |
| 4,503,388 A | * | 3/1985 | Zehl et al. ............... 324/76.37 |
| 4,644,267 A | | 2/1987 | Tsui et al. |
| 4,695,790 A | | 9/1987 | Mathis et al. |
| 4,735,476 A | | 4/1988 | Heffner et al. |
| 5,005,946 A | | 4/1991 | Brandstetter |
| 5,105,380 A | | 4/1992 | Owechko et al. |
| H1059 H | | 5/1992 | Konig et al. |
| 5,327,142 A | | 7/1994 | Tsui et al. |
| 5,347,535 A | | 9/1994 | Karasawa et al. |
| 5,353,109 A | * | 10/1994 | Langdon et al. ........... 356/28.5 |
| 5,363,221 A | | 11/1994 | Sutton et al. |
| 5,377,035 A | | 12/1994 | Wang et al. |
| 5,450,223 A | | 9/1995 | Wagner et al. |
| 5,477,319 A | * | 12/1995 | Shimonaka et al. ........ 356/484 |
| 5,485,009 A | * | 1/1996 | Meyzonnetie et al. ..... 356/5.09 |
| 5,587,829 A | | 12/1996 | Alexander et al. |
| 5,610,705 A | * | 3/1997 | Brosnan et al. ............ 356/28.5 |
| 5,751,830 A | * | 5/1998 | Hutchinson ................. 382/103 |
| 5,963,567 A | | 10/1999 | Veselka et al. |
| 6,094,285 A | * | 7/2000 | Wickham et al. .............. 398/1 |
| 6,137,612 A | * | 10/2000 | Startup ....................... 398/199 |
| 6,269,200 B1 | * | 7/2001 | Wickham et al. ............. 385/15 |
| 6,307,895 B1 | * | 10/2001 | Alexander et al. .......... 375/316 |
| 6,418,152 B1 | * | 7/2002 | Davis .......................... 372/18 |

OTHER PUBLICATIONS

"Evaluation of Optical Channelizers in Terms of RF Performance", by Lodenkamper, et al., *Proceedings of SPIE, Photonics and Radio Frequency*, vol. 3463, pp. 200–211.

"The Design and Performance of a Grating–Based Coherent Optical Wideband RF Signal Channelizer", by Davis et al, *Proceedings of the Ninth Annual DARPA Symposium on Photonics Systems for Antenna Applications in Session 6–Advanced Concepts*, Feb. 1999.

* cited by examiner

*Primary Examiner*—Jason Chan
*Assistant Examiner*—Agustin Bello
(74) *Attorney, Agent, or Firm*—Katten Muchin Zavis Rosenman; John S. Paniaguas

(57) ABSTRACT

An optical channelizer system that is adapted to provide instantaneous RF signal channelization at frequencies on the order of 100 GHz or more into channels having bandwidth as small as a few megahertz. In order to improve the channel resolution the optical channelizer system is formed from a plurality of parallel subchannelizers, for example, twenty-five parallel sub channelizers which can provide 1 GHz channel spacing and 40 MHz signal resolution.

15 Claims, 2 Drawing Sheets

HYBRID COHERENT-OPTICAL, RF SIGNAL CHANNELIZER

CROSS REFERENCE TO RELATED APPLICATIONS

This application is related to commonly owned co-pending patent application, Ser. No. 08/759,901, filed on Dec. 4, 1996, entitled "All Optical RF Signal Channelizer," by Wickham, et al.

BACKGROUND OF THE INVENTION

1. Field of the Invention

The present invention relates to an optical channelizer system and more particularly to an optical channelizer system adapted to provide RF signal channelization at frequencies in the order of 100 GHZ or more which instantaneously channelizes the entire signal spectrum into channels having a few megahertz.

2. Description of the Prior Art

Various factors are driving communications systems toward higher frequency and larger bandwidth. For example, available communications bandwidth is disappearing as the number of users and the bandwidth per user escalates forcing communication links to higher frequencies. In addition, newer communication systems, such as military communications are increasingly being driven toward higher frequencies and larger bandwidth user requirements. For example, modem missile seekers and imaging radar systems are utilizing frequencies around 100 GHz to achieve antenna directivity and higher resolution for small aperture systems. In order to accommodate relatively high bandwidth and high frequencies, RF communications systems are known to employ optical carrier transmission of the RF signal. Examples of such systems are disclosed in U.S. Pat. Nos. 4,468,766; 4,695,790; 5,005,946; 5,347,535; 5,377,035 and U.S. Statutory Invention Registration H1059.

Optical channelizers are used to perform spectral analysis of the newer high frequency communication signals. Such optical channelizers are known to process relatively wider bandwidth than comparable RF channelizers for real time identification of complex signals. Such optical channelizers are used in particular to channelize or divide up a relatively wide bandwidth signal into several subbands or channels. Although such optical channelizers are known to process relatively wider bandwidth than known RF channelizers, many optical channelizers utilize acousto-optic technology which limits the bandwidth to a few gigahertz. Examples of optical communications systems utilizing acousto-optic technology are disclosed in U.S. Pat. Nos. 4,448,494; 4,644, 267; 5,005,946; 5,105,380; 5,327,142 and 5,363,221.

In order to resolve this problem, optical channelizers have been developed which do not depend on the acousto-optic technology as disclosed in commonly owned co-pending U.S. patent application Ser. No. 08/759,901 filed on Dec. 4, 1996. In that application, as illustrated in FIGS. 1 and 2, an optical channelizer, generally identified with the reference numeral 20 includes a diffraction grating. The RF signal spectrum, generally identified with the reference numeral 22, is spatially mapped to positions across a 1×n photo-detector array 24 by the diffraction grating. A mode locked laser 26 provides a comb of optical local oscillator (LO) frequencies 28 (FIG. 2), separated by the desired channel spacing. The LO signals are optically odyned with the signal spectrum at the photo-detector array 24. In this way, each detector generates the same band of optical frequencies so that each channel may use the same post detection electronics. The band is centered on an intermediate frequency (IF) that is determined by adjusting the offset (Fig. 1) in the incident angles at which the signal and the local oscillator lasers illuminate the grating. A complex signal spectrum (phase and amplitude) is extracted by measuring the in-phase and quadrature components of the heterodyne products. Each detector is followed by a IF filter whose bandwidth is generally set to the channel spacing in order to achieve a hundred percent frequency coverage. Unfortunately, due primarily to size constraints, the optical channelizer, disclosed in the '901 patent application, is limited to minimal channel bandwidth of about 1 GHz. Although it is possible to improve the channelizer sensitivity, dynamic range and resolution by reducing the bandwidth of the post detection IF filter, such an approach compromises the frequency coverage. For example, a 1 GHz channelizer with 40 MHz IF only detect signals within the IF filters pass band, thus being blind to 960 MHz out of every 1 GHz of bandwidth or 96% of all possible signals. Thus, there is a need for an optical channelizer for use with signals up to 100 GHz with improved resolution.

SUMMARY OF THE INVENTION

The present invention relates to an optical channelizer system that is adapted to provide instantaneous RF signal channelization at frequencies on the order of 100 GHz or more into channels having bandwidth as small as a few megahertz. In order to improve the channel resolution the optical channelizer system is formed from a plurality of parallel channelizers, for example, twenty-five parallel sub channelizers which can provide 1 GHz channel spacing and 40 MHz signal resolution.

DESCRIPTION OF THE DRAWINGS

These and other advantages of the present invention will be relatively understood with reference to the following specification and attached drawing, wherein.

DETAILED DESCRIPTION OF THE INVENTION

The present invention relates to an optical channelizer system that is adapted to provide RF signal channelization at frequencies on the order of 100 GHz or more which simultaneously channelizes the signal spectrum into channels having bandwidths as small as a few MHz. The optical channelizer system in accordance with the present invention is adapted to provide improved resolution while at the same time maintaining a suitable physical size so that it is deployable on various terrestrial and airborne platforms. In particular, as illustrated in FIGS. 3–5, the optical channelizer system in accordance with the present invention is formed from a plurality of subchannelizers, arranged to operate in parallel.

Figure 1:
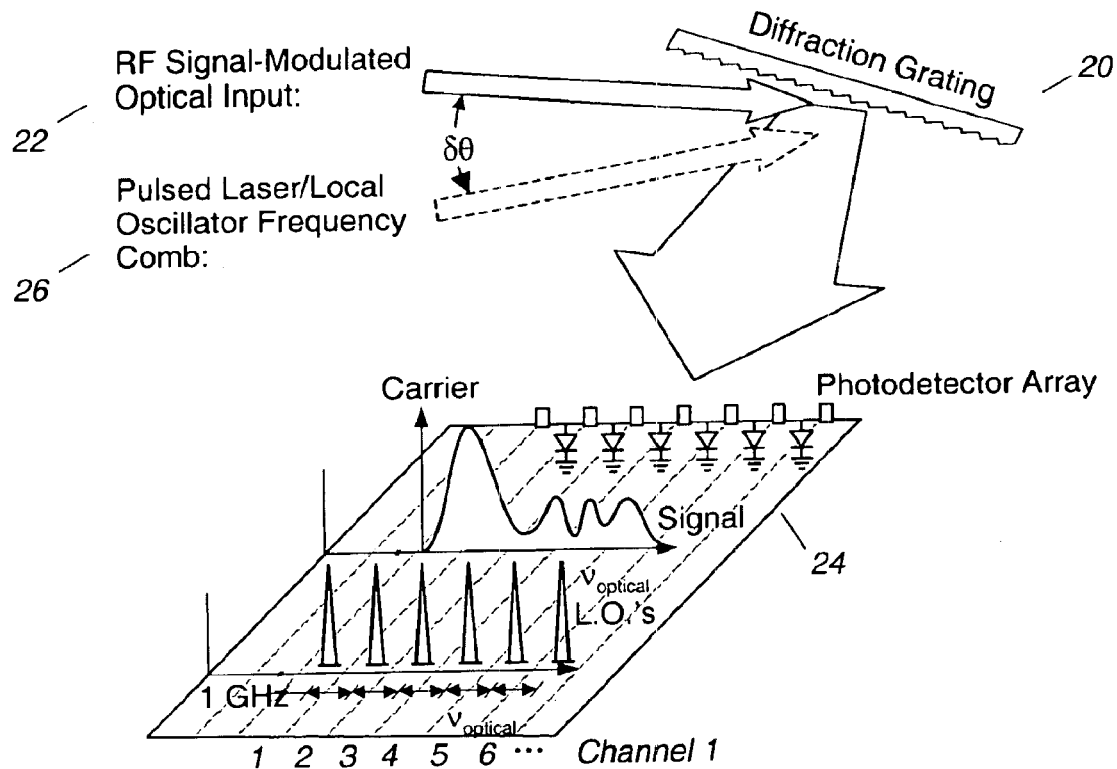
FIG. 1 is a conceptual diagram of a known optical channelizer.
Figure 2:
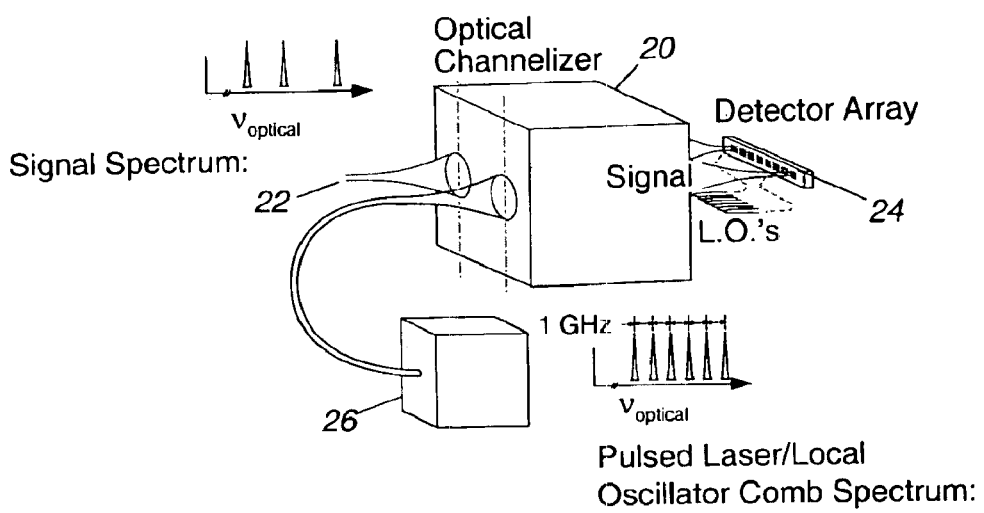
FIG. 2 is a physical drawing of the optical channelizer illustrated in FIG. 1.

Although, the system is described and illustrated for channelizing signals having a bandwidth of a 100 GHz or more, it will be understood by those of ordinary skill in the art, that the principles of the present invention are broadly applicable to signals having a bandwidth more or less than a 100 GHz. An important aspect of the present invention is that the problems associated with the channelizer illustrated in FIGS. 1 and 2 and discussed above are solved by dividing the signal spectrum and the local oscillator comb frequencies prior to applying those signals to an optical channelizer, such as, the optical channelizer 20, discussed above and illustrated in FIGS. 1 and 2. However, it should be understood that the principles of the present invention can be utilizing various types of channelizers, such as channelizers based on integrated optical arrayed wave guide gratings, for example, U.S. Pat. No. 5,943,452.

Figure 3:
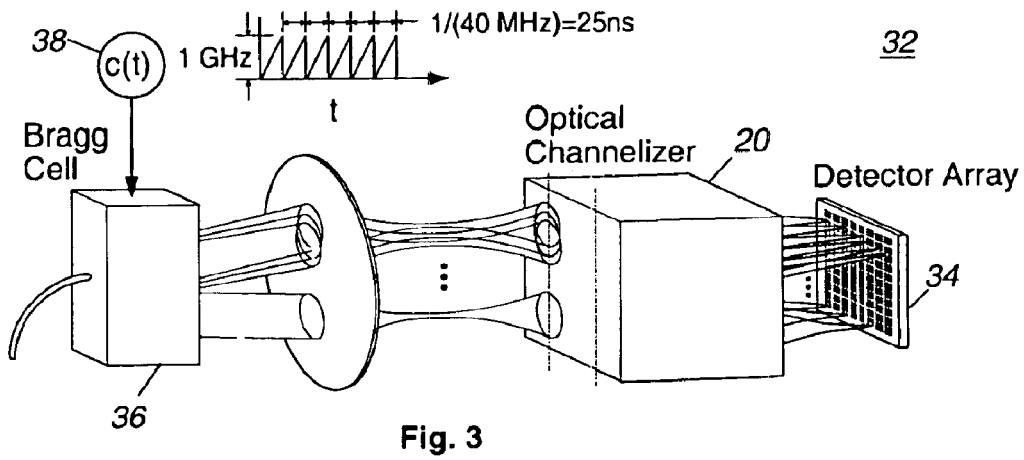
FIG. 3 is a physical diagram of an optical channelizer in accordance with one aspect of the present invention illustrating the use of a Bragg cell for replicating the signal spectrum.

Referring to FIG. 3, the optical channelizer system in accordance with the present invention is generally identified with the reference numeral 32. The optical channelizer system 32 includes an optical channelizer 20, for example, the optical channelizer 20 illustrated in FIGS. 1 and 2 and discussed above, a m ×n dimensional photo detector array 34 as opposed to the 1×n detector array used with the channelizer 20, illustrated in FIG. 2, and a source of a local oscillator frequency comb, with the frequencies, separated, for example, by 1 GHz. In order to generate multiple signal beams, the signal spectrum is passed through a Bragg cell 34. Such Bragg cells are generally known in the art. An example of a suitable Bragg cell 34 is disclosed in I. C. Chang, "Acousto-optic Devices and Applications," IEEE Trans-Sonics and Ultrasonics, Vol. 50-23, P. 2 (1976). The Bragg cell 26 can be driven to replicate the signal spectrum to generate, for example, 25 signal beams, with each version of the signal spectrum being shifted, for example, by 40 MHz with respect to its predecessor. As shown in FIG. 3, in order to provide such separation, a periodic chirp signal, for example 1 GHz, generally identified with the reference numeral 38, is used to drive the Bragg cell 36. In order to replicate the signal spectrum 25 with each version of the signal spectrum frequency shifted by, for example, 40 MHz with respect to its predecessor, the period of each chirp signal is selected to be 1/40 MHz or 25 ns. The 25 signal beams are applied to the optical channelizer 20 and translated unto the m×n detector array 34. As a result, the image of each signal spectrum is imaged onto a different row of the m×n detector array 34 and translated horizontally. An optical amplifier (not shown) may be used to amplify the signal before it has been replicated 25 times by the Bragg cell 36.

Figure 4:
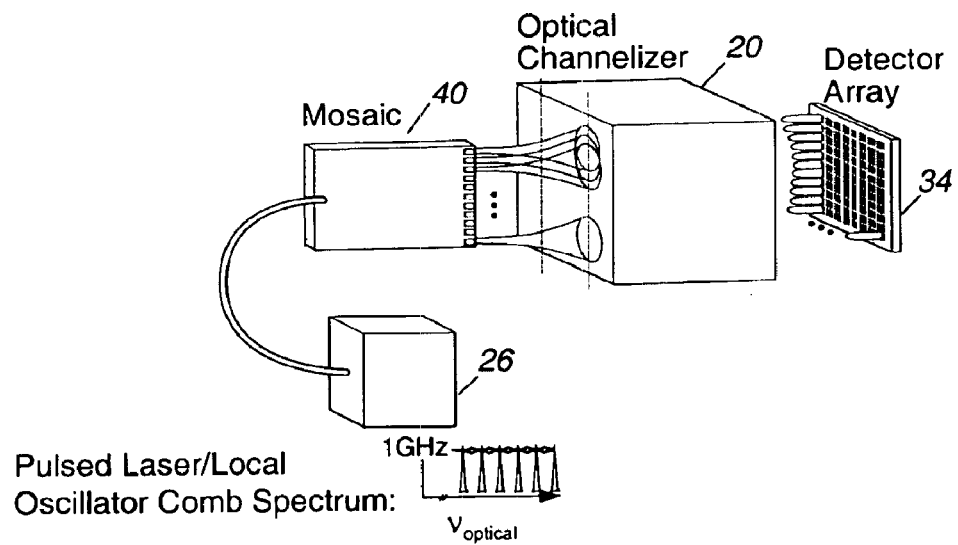
FIG. 4 is a physical diagram of the optical channelizer in accordance with illustrating the use of the present invention a monolithic optical splitter/amplifier integrated circuit (MOSAIC) for splitting the LO signals.
Figure 5:
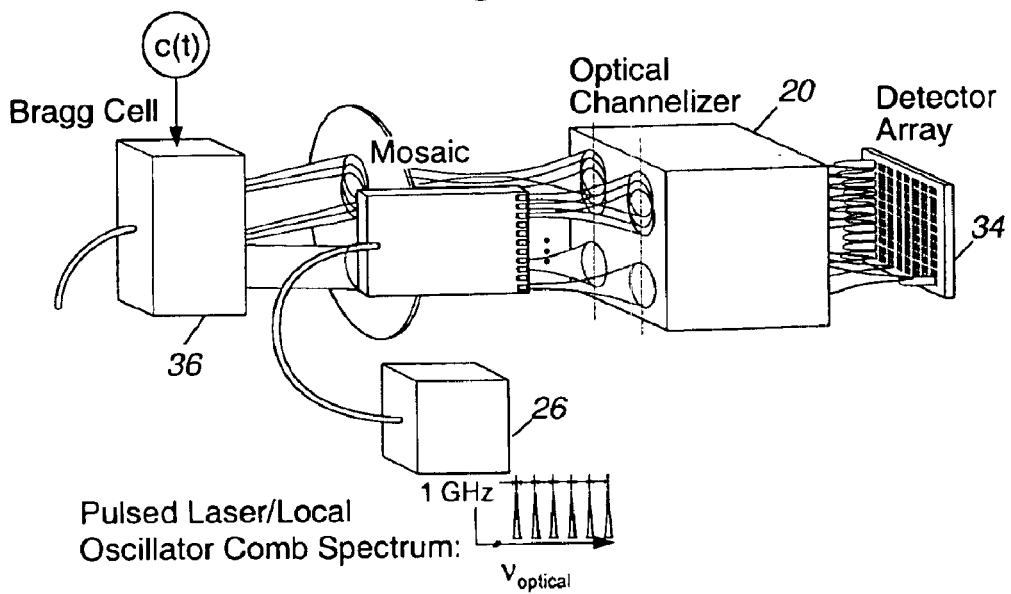
FIG. 5 illustrates the invention utilizing the MOSAIC as well as the Bragg cell.

FIG. 4 illustrates a system for spatially dividing the local oscillator input beam, for example 25 times. As shown in FIG. 5, a monolithic, optical splitter/amplifier integrated circuit (MOSAIC) may be used to spatially divide the local oscillator signal. The output of the MOSAIC 30, in turn, is applied to the optical channelizer 20. In particular, the resulting images of the local oscillator spectrum are projected onto horizontal rows of the photo detector array 34. With such an arrangement, each photo detector 34 processes a different 40 MHz segment of the signal with identical post detection electronics. The signal frequencies detected by adjacent elements in a particular row differ by 1 GHz. Neighboring rows operate on segments that are displaced by 40 MHz and so on for each role until the entire 1 GHz is spanned. With such an arrangement a number of subchannelizers are formed and operated in parallel.

Alternatively, the signal spectrum can be replicated identically, for example, by being passed through the MOSAIC 40, while the local oscillator beam is passed through the Bragg cell 36 to generate frequency shifted versions of the LO spectrum. Since it is desirable to maintain the LO spots centered on their respective detectors, the rows of detectors may have to be skewed.

Obviously, many modifications and variations of the present invention are possible in light of the above teachings. For example, the invention can be implemented utilizing virtually any type of optical channelizers, such as one based on integrated optical arrayed waveguide gratings. Thus, it is to be understood that, within the scope of the appended claims, the invention may be practiced otherwise than as specifically described above.

What is claimed and desired to be secured by Letters Patent of the United States is:

1. An optical channelizer system for dividing up a relatively wide bandwidth optical signal into a plurality of subchannels, the optical channelizer system comprising:
   an optical local oscillator (LO) for providing a comb of LO optical frequencies;
   an optical splitter for spatially dividing said comb of LO optical frequencies into a plurality of LO signals;
   a device for receiving a source of optical signals having a predetermined bandwidth and providing a plurality of replicated versions of said optical signals, each version being translated with respect to each other by a predetermined frequency;
   an optical channelizer for receiving said replicated optical signals and said plurality of LO signals; and
   a photo detector array disposed adjacent said optical channelizer for receiving the images of said replicated optical signals and said LO signals.

2. The optical channelizer system as recited in claim 1, wherein said optical channelizer includes a diffraction grating.

3. The optical channelizer system as recited in claim 1, wherein said optical channelizer includes an integrated optical array wave guide grating.

4. The optical channelizer system as recited in claim 1, further including an optical amplifier for amplifying said LO optical signals.

5. The optical channelizer system as recited in claim 4, wherein said optical splitter and optical amplifier is formed from a monolithic optical splitter/amplifier integrated circuit (MOSAIC).

6. The optical channelizer as recited in claim 1, wherein said device for providing a plurality of replicated signals is a Bragg cell.

7. An optical channelizer system for dividing up a relatively wide bandwidth optical signals into a plurality of subchannels, the optical channelizer comprising:
   an optical local oscillator (LO) for providing a comb of LO optical frequencies defining LO signals;
   a device for providing a plurality of replicated LO signals, each replicated signal being separated from each other by a predetermined frequency;
   an optical splitter for receiving said relatively wide bandwidth optical signals and spatially separating said optical signal into a plurality of replicated optical signals;
   an optical channelizer for receiving said plurality of replicated signals from said device and said optical splitter; and
   a photo detector disposed adjacent said optical channelizer for receiving said replicated optical and LO signals.

8. The optical channelizer system as recited in claim 7, further including an optical amplifier for amplifying said optical signals.

9. The optical channelizer system as recited in claim 7, further including an optical amplifier and wherein said optical splitter and optical amplifier are formed from a monolithic optical splitter/amplifier integrated circuit (MOSAIC).

10. The optical channelizer as recited in claim 7, wherein said device for providing a plurality of replicated LO signals is a Bragg cell.

11. An optical channelizer system for separating relatively wideband optical signals into a plurality of sub-channels comprising:

a plurality of optical sub-channelizers, each subchannelizer including means for spatially splitting one or the other of said optical signals or said LO signals;

means for replicating and frequency shifting the other of said optical signal or said LO signals;

an optical channelizer for receiving signals from said splitting means and said replicating means; and a photo detector array for receiving said signals from said optical channelizer.

12. The optical channelizer system as recited in claim 11, wherein said optical channelizer includes a diffraction grating.

13. The optical channelizer system as recited in claim 11, wherein said replicating means includes a Bragg cell.

14. The optical channelizer system as recited in claim 1, further including an optical amplifier.

15. The optical channelizer system as recited in claim 14, wherein said optical amplifier and said splitting means are formed from monolithic optical splitter/optical amplifier integrated circuit (MOSAIC).

* * * * *